(12) United States Patent
Saladin et al.

(10) Patent No.: US 6,705,137 B2
(45) Date of Patent: Mar. 16, 2004

(54) LOCK DEVICE FOR SEMITRAILERS AND THE LIKE

(75) Inventors: Edward H. Saladin, Schererville, IN (US); Edward C. Flory, Crown Point, IN (US)

(73) Assignee: American Lock Company, Crete, IL (US)

( * ) Notice: Subject to any disclaimer, the term of this patent is extended or adjusted under 35 U.S.C. 154(b) by 0 days.

(21) Appl. No.: 10/178,024

(22) Filed: Jun. 21, 2002

(65) Prior Publication Data

US 2003/0233858 A1 Dec. 25, 2003

(51) Int. Cl.⁷ .............................................. B60R 25/02
(52) U.S. Cl. .............................. 70/212; 70/237; 70/258; 70/164; 70/14
(58) Field of Search ............................ 70/211, 212, 237, 70/258, 229–232, 201–203, 164, 158, 14, 18, 19, 54–56

(56) References Cited

U.S. PATENT DOCUMENTS

| | | | | | |
|---|---|---|---|---|---|
| 1,026,189 | A | * | 5/1912 | Wheeler | 70/212 |
| 1,341,055 | A | * | 5/1920 | Harvey | 70/212 |
| 1,358,681 | A | * | 11/1920 | Parker | 70/218 |
| 1,498,772 | A | * | 6/1924 | Anderson | 70/212 |
| 3,362,426 | A | * | 1/1968 | Polit et al. | 70/212 X |
| 4,498,320 | A | * | 2/1985 | Mullis | 70/212 X |
| 5,115,834 | A | * | 5/1992 | Champagne | 70/212 X |
| 5,141,119 | A | * | 8/1992 | Milazzo | 70/212 X |
| 5,782,115 | A | | 7/1998 | Judy | |
| 6,141,997 | A | * | 11/2000 | Blehi, III | 70/237 X |
| 6,155,086 | A | * | 12/2000 | Miller | 70/237 X |
| 6,434,982 | B1 | * | 8/2002 | Rowland | 70/211 |

OTHER PUBLICATIONS

Website page re: Enforcer Landing Gear Lock by Transport Security, Inc.

* cited by examiner

*Primary Examiner*—Suzanne Dino Barrett
(74) *Attorney, Agent, or Firm*—Calfee, Halter & Griswold LLP

(57) ABSTRACT

A lock device is provided for use with a truck semi-trailer. The semitrailer has a dolly wheel or landing gear system alternately configurable between a trailer support configuration and a trailer travel configuration. The lock device comprises a rigid, one-piece hollow box adapted to fit over and enclose portions of both a crankshaft and a drive shaft of a dolly wheel or landing gear system so as to prohibit movement of a crank into a crank operating position. The box has first and second adjacent but mutually perpendicular closed sides which are adapted to be located adjacent to portions of the crankshaft and the drive shaft. Third and fourth adjacent but mutually perpendicular box sides are at least partially open and are adapted to permit the crankshaft and the drive shaft to extend therethrough. Fifth and sixth mutually parallel sides are located perpendicularly to and at the edges of the first, second, third and fourth sides. These fifth and sixth sides define mutually aligned holes through which a shackle lock can be passed to secure the lock box over portions of the crankshaft and drive shaft assembly so as to prohibit the dolly wheel or landing gear system from being operated by unauthorized personnel.

16 Claims, 3 Drawing Sheets

LOCK DEVICE FOR SEMITRAILERS AND THE LIKE

BACKGROUND OF THE INVENTION

This invention relates generally to lock devices for semitrailers and the like, and more particularly to devices for preventing the unauthorized operation of a dolly wheel or a landing gear system of a semitrailer.

Thefts or unauthorized movements of semitrailers are a serious and expensive problem. Virtually all modern semitrailers used to handle freight and merchandise of any sort are equipped with large, over-the-road rear truck wheels, and a dolly wheel or landing gear system is located near the front of each trailer. When the semi truck driver wants to disconnect or "drop" the trailer he is pulling, he stops his truck at the desired location and then engages and turns a dolly wheel or landing gear crank handle, usually located on the left side of the trailer near the trailer front. This crank handle operates a dolly wheel or landing gear system to lower small, relatively rigid wheels or skids into engagement with the pavement or ground directly under the front of the semitrailer. Further operating the crank handle slightly raises the trailer front so as to disengage the trailer kingpin from the truck tractor or cab. When the trailer is disengaged, the truck driver can drive the tractor or cab away.

Some thieves believe it is easy to reposition or steal these dropped, standing trailers. These thieves simply bring another tractor to the trailer, engage the kingpin, raised the dolly wheels or landing gear, and drive the cab and now-connected trailer to a secluded location where the trailer can be opened and robbed. Lock devices to prevent unauthorized access to the trailer kingpin are awkward to install and remove, messy, and sometimes ineffective.

It is therefore important to be able to secure the dolly wheel or landing system in its lowered, ground-engaging position. If the dolly wheels or landing gear cannot be raised to a traveling position, the trailer cannot be moved. If the trailer cannot be moved, thieves are discouraged from attempting to rob the trailer. Alternatively, it may be desirable to secure the dolly wheels or landing gear in the raised position, so as to prevent thieves from disengaging the trailer from a parked trailer tractor or cab.

Several devices have been offered to prevent unauthorized access to the semitrailer dolly wheel or landing gear systems. One such device is described and illustrated in U.S. Pat. No. 5,782,115. Another device, denominated as The Enforcer Landing Gear Lock, is offered by Transport Security, Inc. of Waconia, Minn. A relatively inexpensive method of securing the landing gear crank handle against unauthorized movement is to wrap a length of chain around the handle and an adjacent landing gear stanchion or other fixture, and then secure the chain by a padlock. Some of these devices or arrangements are expensive, or complicated, or ineffective.

It is therefore the general object of this invention to provide a strong, secure lock for a truck semitrailer to prohibit unauthorized movement of the trailer.

It is a more specific object of the invention to provide a strong and secure lock device for a truck semitrailer to prohibit unauthorized operation of the trailer dolly wheel or landing gear system.

It is another object of the invention to provide a unitary, one-piece, rigid lock box adapted to fit over portions of the semitrailer dolly wheel or landing gear system so as to prevent unauthorized operation of that system.

It is an ancillary object to provide a lock device for a truck semitrailer which is low in manufacturing cost but high in strength and effectiveness.

Other objects and advantages of the invention will become apparent on reading the following detailed description and upon reference to the drawings. Throughout the drawings, like reference numerals refer to like parts.

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
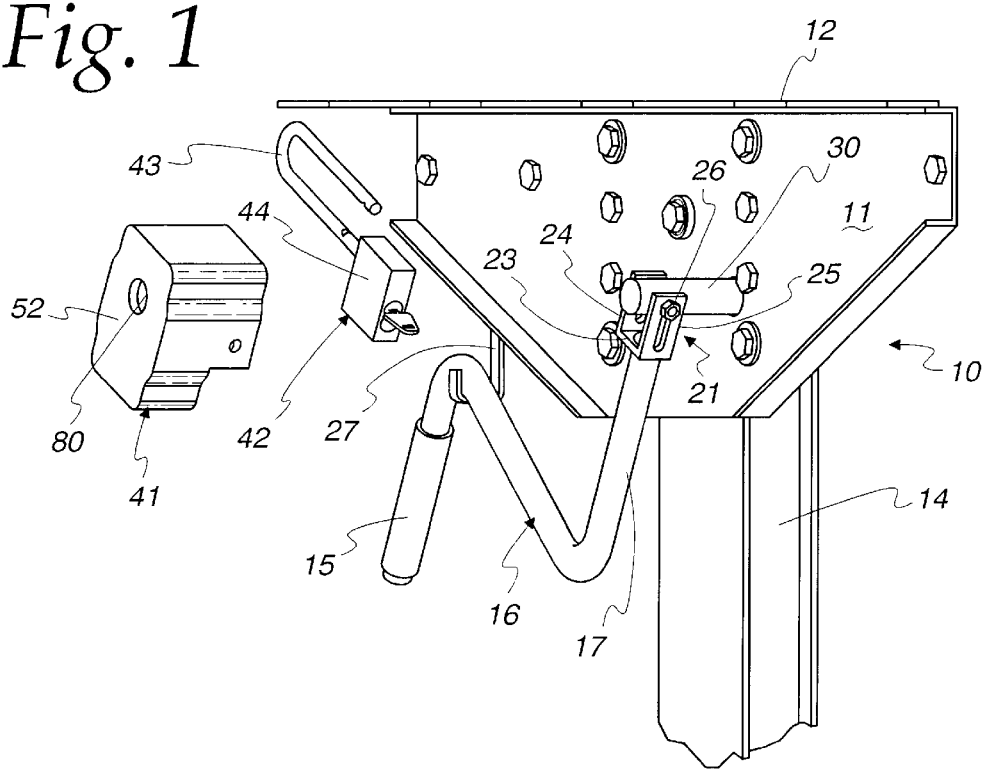
FIG. 1 is an exploded view showing a portion of the semitrailer dolly wheel or landing gear system, including a drive shaft and crank, and showing the novel lock device of the present invention ready for installation over portions of the crank handle and drive shaft.
Figure 2:
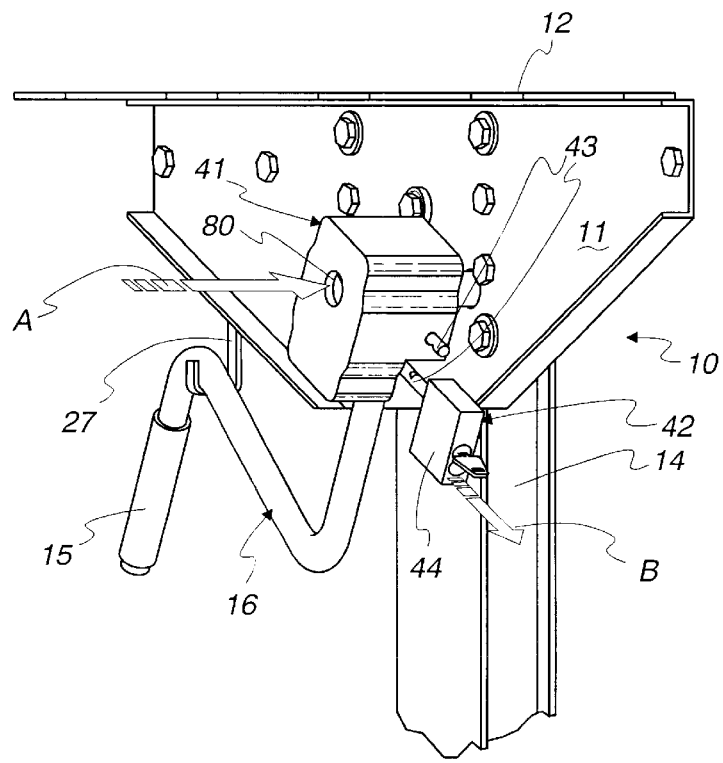
FIG. 2 is an exploded view similar to FIG. 1 showing the lock device as it appears when it is being installed over the crank handle and drive shaft.
Figure 3:
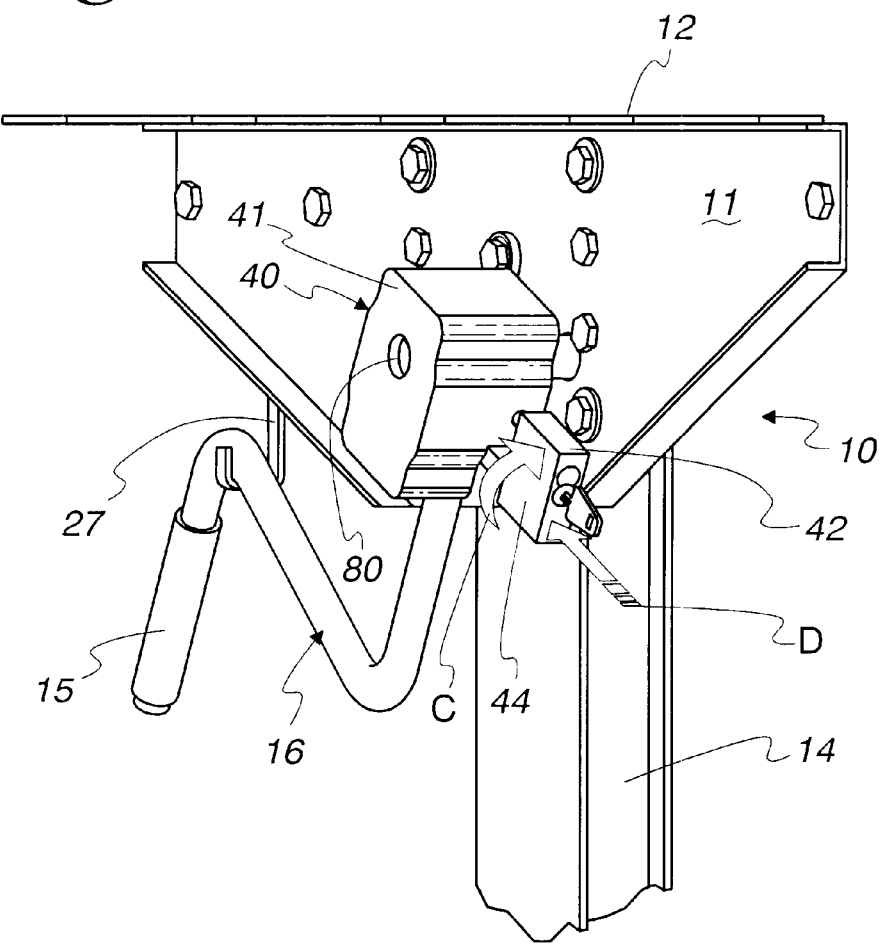
FIG. 3 is an exploded view similar to FIGS. 1 and 2 and showing the lock device installed over the crank handle and drive shaft and with an extended-shackle lock installed on the lock device.

Turning first to FIGS. 1, 2 and 3, there are shown portions of a semitrailer dolly wheel or landing gear system 10. Here this system includes several flange plates 11 secured to the underside 12 of a semitrailer near the semitrailer front (not shown). Depending from these flange plates 11 is one or more dolly wheel or landing gear struts 14. At the bottom of the struts, small, rigid dolly wheels or skids (not shown) can be lowered into engagement with pavement or ground under the trailer by turning the handle 15 of a crank 16 in one direction. The dolly wheels or skids can be raised out of engagement with the pavement or ground under the trailer when the trailer is connected to a tractor or cab simply by turning the crank 16 in the opposite direction.

As shown in FIG. 1, the dolly wheel or landing gear operating system 10 includes the crank 16, which comprises a crank handle 15 and crankshaft 17. A yoke 21 affixed to the end of the crankshaft 17 includes a bight portion 23 which extends to two legs 24, 25. A cross-pin or bolt 26, shown particularly in FIG. 4, interconnects the yoke legs 24 and 25 to a drive shaft 30, and that drive shaft 30 is connected to other portions (not shown) of the dolly wheel or landing gear operating system 10.

As can be envisioned by reference to FIG. 1, the dolly wheel or landing gear system can be operated by removing the handle crank handle 15 from its rest or carrying bracket 27, and pivoting the crank 16 about the cross pin 26 so as to put the crankshaft 17 in general axial alignment with the system drive shaft 30. It will be understood that, when the crankshaft 17 is not axially aligned with the drive shaft 30, it is virtually impossible for anyone to operate the landing gear or dolly wheel system so as to raise or lower the dolly wheels or landing gear skids. If the system cannot be operated, it is virtually impossible to steal the trailer.

To maintain this system 10 in its inoperative configuration so as to prohibit unauthorized operation of the trailer in accordance with the invention, a lock device 40 comprising a rigid, hollow box 41 and a lock 42 having an extended shackle 43 and lock body 44 (FIG. 1) is provided.

Figure 4:
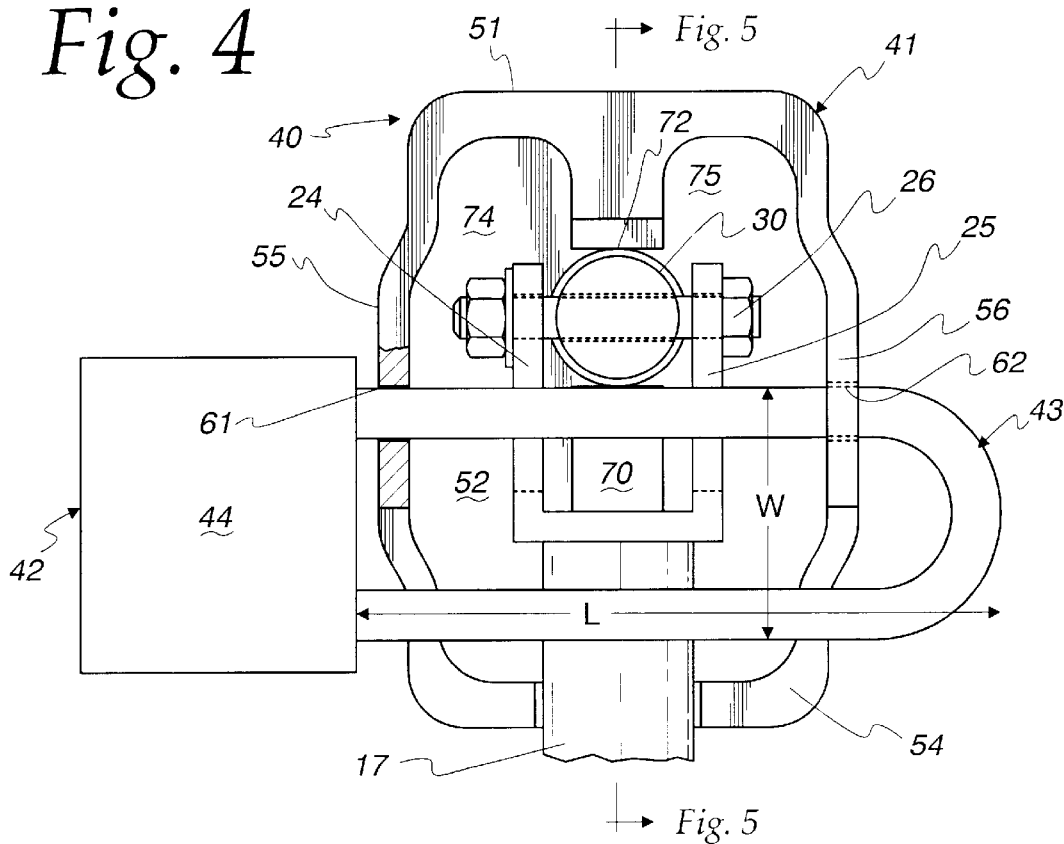
FIG. 4 is an elevational view showing the lock device box and lock as they appear when installed over portions of the drive shaft and crankshaft.
Figure 5:
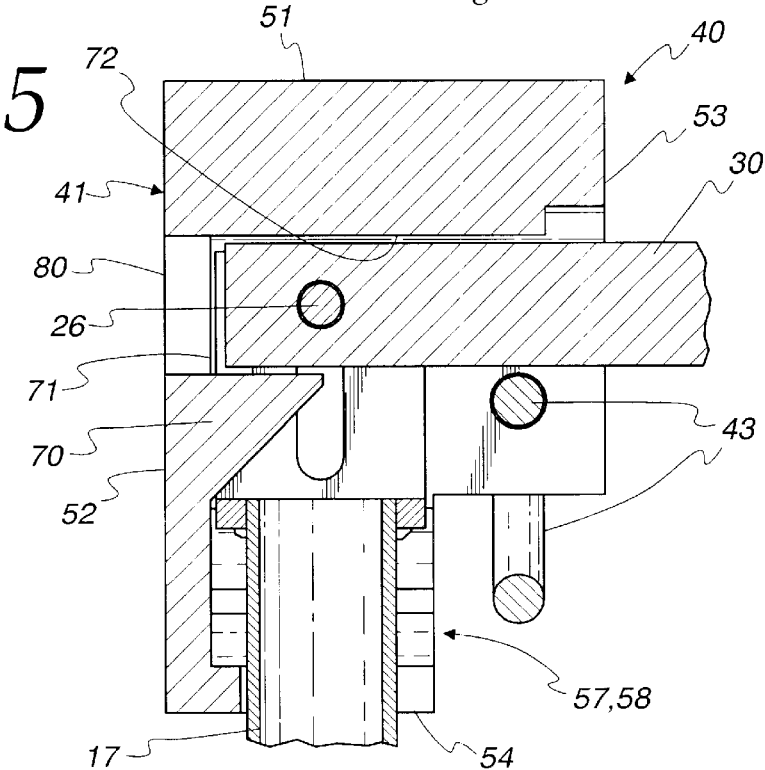
FIG. 5 is a partial sectional view taken substantially in the plane of line 5—5 in FIG. 4.

As shown especially in FIGS. 4 and 5, the unitary, substantially rectilinear, rigid hollow box 41 has six sides and is adapted to fit over at least portions of the crankshaft 17 and the drive shaft 30. First and second sides 51 and 52 are closed and are adjacent but mutually perpendicular to one another, and they are adapted to be located adjacent to portions of the crankshaft 17 and drive shaft 30. Third and fourth sides 53 and 54 are adjacent but mutually perpendicular to one another but are at least partially open and adapted to permit the crankshaft 17 and the drive shaft 30 to extend therethrough, as particularly shown in FIG. 5. Fifth and sixth opposed sides 55 and 56 are mutually parallel to one another and are located perpendicularly to the edges of the first, second, third and fourth sides 51–54. Together the box sides (especially sides 55 and 56) prohibit access to the yoke 21 and its cross-pin bolt 26 that the box 41 covers and protects. Cutout box corners 57 and 58 partially define apertures sized and shaped to receive a portion of the lock body 44 when the lock 42 is positioned for locking engagement with the box 41.

Mutually aligned holes 61 and 62 are defined in the fifth and sixth box sides 55 and 56. Through these holes 61 and 62, the lock shackle 43 can be passed to secure the lock box 41 over portions of the crankshaft 17 and drive shaft 30. As illustrated particularly in FIG. 5, these aligned holes 61 and 62 are located so as to position the shackle 43 on sides of the crankshaft 17 and drive shaft 30 opposite the sides of the crankshaft 17 and drive shaft 30 which confront the first and second box sides 51 and 52. The shackle 43 is of extended length, and here has a length L. which is substantially twice the shackle width W.

To secure the crank handle 17 against unauthorized movement into axial alignment with the drive shaft 30 in accordance with the invention, a box finger 70 having a first or upper surface 71 extends from the second box side 52 into engagement with the drive shaft 30 and with the yoke 21. This finger-yoke engagement affirmatively prohibits movement of the crankshaft 17 and crank 16 into a crank operating position. To further accurately locate the box 41 with respect to one of the shafts 17 and 30 (here, the drive shaft 30), a second stop surface 72 is oriented for confronting the drive shaft 30 along an extended axial length of the shaft so as to closely position the box 41 in its shaft movement-prohibiting position, as shown particularly in FIG. 5. If desired, recesses 74 and 75 within the box interior can be provided to partially define this abutment and surface 72.

As shown in FIGS. 1, 2, 3, and 5, the lock box 41 is provided with an aperture 80 extending through the box sides 52. This aperture 80 is of sufficient size and is shaped to provide at least a limited view into the box 41 interior, so as to aid the lock device user in positioning the box on and over the crankshaft 17 and drive shaft 30. As suggested particularly in FIG. 5, this aperture 80 can also accommodate an extension of the drive shaft 30.

In accordance with the invention, installation and authorized removal of the lock device 40 is easy. As suggested in FIGS. 1, 2 and 3, the crank 16 is first hung on its bracket 27 as illustrated. The lock box 41 is then put forward in the direction of the arrow A. in FIG. 2. The box 41 can be guided into position by looking through the aperture 80. The lock 42 is then installed by inserting the free leg of the shackle 43 through the box apertures 61, 62 as suggested by the arrow B in FIG. 2. The lock body 44 is then rotated into position as suggested by the arrow C in FIG. 3, and the lock body 42 is pushed onto and secured to the shackle 43 in the direction of the arrow D. When so installed, the box 41 prohibits moving the crank 16 and associated dolly wheels or landing gear system, and the box prohibits access to the yoke 21, cross-pin 26 or drive shaft 30. Thus, the dolly wheel or landing gear system cannot be bypassed, and the trailer cannot be moved.

The lock box 41 can be made of any suitable steel or other material which is highly resistant or impervious to cutting, prying, torching or other destructive attacks. The lock 42 having its extended shackle 43 can be obtained from a number of manufacturing sources, including the American Lock Company of Crete, Ill.

What is claimed is:

1. A lock device for use with a truck semitrailer, the semitrailer having a dolly wheel system alternately configurable between a trailer support configuration and a trailer travel configuration;

the dolly wheel system including a drive shaft for operating said system and a crank having a crankshaft for turning the drive shaft;

the crankshaft being pivotally connected to the drive shaft to permit the crankshaft and an associated crank to be moved between a crank-stowed position and a crank-operating position;

the lock device comprising a rigid, one-piece hollow box, having two opposed, generally parallel sides, each side defining a side corner cutout, the corner cutout being shaped to receive a lock body and a portion of a lock shackle when the lock is locked to said box adapted to fit over and enclose portions of both the crankshaft and the drive shaft so as to prohibit movement of the crank into a crank operating position; and a lock having a shackle engageable with two opposed sides of the box for locking the box over portions of the drive shaft and the crankshaft.

2. A lock device according to claim 1 wherein said lock includes a shackle of extended length.

3. A lock device according to claim 2 wherein said lock shackle is at least twice as long as it is wide.

4. A lock device according to claim 1 wherein the crankshaft is pivotally connected to the drive shaft by a yoke and cross bolt, said box fitting over the yoke and cross bolt and having a box finger extending into engagement with at least one of the shafts and with the yoke so as to prohibit movement of the crank into a crank operating position.

5. A lock device for attachment to a crank system, the crank system having a crankshaft and a drive shaft connected to the crankshaft, the lock device preventing the crank system from being reconfigured from a crank-stowed position in which the crankshaft is substantially not axially aligned with the drive shaft to a crank-operating position in which the crankshaft is substantially axially aligned with the drive shaft;

the lock device comprising a unitary, one-piece, rigid, hollow box, having two opposed, generally parallel sides, each side defining a side corner cutout, the corner cutout being shaped to receive a lock body and a portion of a lock shackle when the lock is locked to said box, the box being adapted to fit in a locking position over at least portions of the crank system crankshaft and drive shaft; and and a lock engageable with two opposed sides of the box for locking the box in said locking position to prohibit the crank from being located in its crank-operating position.

6. A lock device according to claim 5 wherein the crankshaft and drive shaft are connected to each other by a bi-legged yoke attached to one shaft and a cross-pin extending perpendicularly through the other shaft and through both yoke legs to permit the crankshaft to be moved into and out of axial alignment with the drive shaft; and wherein said box includes a box finger element located to extend between the yoke legs and adjacent at least one shaft for inhibiting pivoting movement of the shafts relative to one another.

7. A lock device according to claim 1 wherein said box includes a first stop surface for engaging a surface of said crankshaft or said drive shaft to closely position the box in its crankshaft-movement-prohibiting position.

8. A lock device according to claim 7 wherein said box includes a second stop surface extending substantially parallel with and confronting a surface of extended axial length on said drive shaft or on said crankshaft to closely position the box in its shaft movement-prohibiting position.

9. A lock device according to claim 8 wherein said first stop surface defines a shaft abutment surface structure located between recesses defined in the box interior.

10. A lock device according to claim 1 wherein each of said mutually parallel sides defines an aperture sized and shaped to receive a portion of a lock shackle.

11. A lock device according to claim 1 wherein said one side of said box defines a shaft relief for receiving an extension of the drive shaft assembly.

12. A lock device according to claim 11 wherein said relief extends through the box side and is of sufficient size and shape to provide at least a limited view into the box interior, whereby to aid the lock device user in positioning the box on and over the crankshaft and drive shaft.

13. A lock device for preventing a crank system having a crankshaft and drive shaft assembly from being reconfigured from a crank-stowed position in which the crankshaft is not substantially axially aligned with the drive shaft to a crank-operating position in which the crankshaft is substantially axially aligned with the drive shaft, the lock device comprising:

a unitary, substantially rectilinear, rigid hollow box having six sides and adapted to fit over at least portions of the crankshaft and drive shaft assembly;

the box having first and second adjacent but mutually perpendicular closed sides which are adapted to be located adjacent to portions of the crankshaft and the drive shaft;

third and fourth adjacent but mutually perpendicular sides which are at least partially open and adapted to permit the crankshaft and the drive shaft to extend therethrough;

the box having fifth and sixth mutually parallel sides which are located perpendicularly to and at the edges of the first, second, third and fourth sides; and the fifth and sixth sides defining mutually aligned holes through which a one leg only of a bi-legged shackle of a lock can be passed to secure the lock box over portions of the crankshaft and drive shaft assembly.

14. A lock device according to claim 13 further including a lock having a lock body and a shackle which is of extended length.

15. A lock device according to claim for 13 wherein the aligned holes in said fifth and sixth sides are located so as to position the shackle on sides of the crankshaft and drive shaft opposite to the sides of the crankshaft and drive shaft which confront the first and second box sides.

16. A lock device for use with the dolly wheel system of a truck semi trailer, the dolly wheel system including a drive subsystem for operating the dolly wheel system, the lock device comprising a lock having a bi-legged U-shaped shackle a box adapted to fit over at least part of the dolly wheel drive subsystem and having at least two box sides spaced apart from one another, the box sides defining mutually aligned holes through which one leg of the lock shackle can pass, the box side holes being located sufficiently near edges of the box sides so as to permit the other leg of the shackle to be positioned outside of the box sides when the box is installed in a locking position on the dolly wheel drive subsystem and the lock shackle is installed on the box.

* * * * *